(12) United States Patent
Yu

(10) Patent No.: US 6,878,226 B2
(45) Date of Patent: Apr. 12, 2005

(54) CONTINUOUS METHODS OF MAKING MICROPOROUS BATTERY SEPARATORS

(76) Inventor: Wei-Ching Yu, 430 Carleton Cir., Spartanburg, SC (US) 29301

(*) Notice: Subject to any disclaimer, the term of this patent is extended or adjusted under 35 U.S.C. 154(b) by 108 days.

(21) Appl. No.: 10/041,348

(22) Filed: Jan. 8, 2002

(65) Prior Publication Data

US 2003/0136500 A1 Jul. 24, 2003

(51) Int. Cl.[7] .......................... B29C 7/00; B29C 47/00; B32B 31/00
(52) U.S. Cl. ................... 156/229; 156/160; 156/244.11; 264/46.1
(58) Field of Search .............................. 156/229, 160, 156/277, 204, 244.11, 244.12; 429/144, 145, 247, 254; 264/46.1, 154, 210.1

(56) References Cited

U.S. PATENT DOCUMENTS

| | | | |
|---|---|---|---|
| 3,426,754 A | | 2/1969 | Bierenbdum et al. |
| 3,558,764 A | | 1/1971 | Isaacson et al. |
| 3,679,538 A | | 7/1972 | Druin et al. |
| 3,679,540 A | | 7/1972 | Zimmerman et al. |
| 3,801,404 A | | 4/1974 | Druin et al. |
| 3,801,692 A | | 4/1974 | Zimmerman et al. |
| 3,843,761 A | | 10/1974 | Bierenbaum et al. |
| 3,932,682 A | | 1/1976 | Loft et al. |
| 4,138,459 A | | 2/1979 | Brazinsky et al. |
| 4,384,023 A | * | 5/1983 | Okamura et al. ............ 428/338 |
| 4,539,256 A | | 9/1985 | Shipman et al. |
| 4,726,989 A | | 2/1988 | Mrozinski |
| 4,994,335 A | | 2/1991 | Kamaei et al. |
| 5,173,235 A | | 12/1992 | Kamei et al. |
| 5,565,281 A | | 10/1996 | Yu et al. |
| 5,667,911 A | * | 9/1997 | Yu et al. ..................... 429/144 |
| 5,691,077 A | | 11/1997 | Yu |
| 5,952,120 A | | 9/1999 | Yu et al. |
| 6,080,507 A | | 6/2000 | Yu |
| 6,132,654 A | * | 10/2000 | Yu ............................. 264/46.1 |

* cited by examiner

Primary Examiner—Sue A. Purvis

(57) ABSTRACT

A continuous method of making dry-stretch microporous membrane battery separators from polypropylene (PP) or polyethylene (PE) or both benefits to the manufacturers in the production efficiency. The precursor-film extrusion in this invention is accomplished by multiple small film-extrusion lines at a compatible line speed with the followed oven processes (annealing and stretching). The overall production process starts continuously from film extrusion to annealing and to stretching. The benefits of the inventive continuous process includes a higher product yield, more effective oven-time usage, no need to handle and manage the intermediate products, less need in labor and machine maintenance, and potentially more stable product quality.

The dry-stretch membrane separators made with this inventive continuous method include (1) single-ply PP or PE separators having a thickness ranging from 0.2 mil to 2.0 mil; (2) PP/PE/PP trilayer microporous membrane separators having a thickness ranging from 0.6 mil to 4.0 mil. The PP/PE/PP trilayer can be accomplished in the early extrusion via either co-extrusion or extruding separately and then interposing PE layer between two PP layers, continuously, right before annealing/bonding and stretching process.

2 Claims, 2 Drawing Sheets

US 6,878,226 B2

CONTINUOUS METHODS OF MAKING MICROPOROUS BATTERY SEPARATORS

CROSS-REFERENCE TO RELATED APPLICATIONS

Not applicable.

BACKGROUND

1. Field of the Invention

This invention relates to dry stretched polyolefin (PP, PE, and PP/PE/PP) microporous membranes as battery separators, specifically to the continuous method of making the membrane separators.

2. Discussion of Prior Art

In batteries, the anode and cathode are separated from one another by a separator. Today, "lithium batteries" are very popular because they are able to generate high-energy outputs. The lithium battery market can be divided into two groups, the "primary" lithium battery and the "secondary" lithium battery. The primary lithium battery is a disposable battery, while the secondary lithium battery is a rechargeable battery.

The rechargeable lithium battery technology was first commercialized by Sony in 1992. Since then, this new type of high-energy rechargeable batteries has been widely used in consumer markets, such as computer, camcorder and cellular phone. More applications are being developed. One of them is the Electric Vehicle (EV) and the Hybrid Electric Vehicle (HEV) applications.

However, the rechargeable lithium batteries for EV and HEV applications are significantly larger than the consumer rechargeable lithium batteries. The separator used in the batteries needs much more square footage than that in the consumer batteries. In the EV and HEV batteries, the unit cost of the separator needs to be much lower to make the EV and HEV batteries commercially possible. In addition, the cost of the separator in non-rechargeable lithium battery remains relatively high in comparison to that of the separators in other types of batteries.

In summary, there is a strong need for low-cost separators for lithium batteries, especially for rechargeable lithium battery.

The separators for lithium batteries can be made from polyolefin basically with two types of processes in the prior art: dry-stretch process and solvent-stretch process. The solvent-stretch process (such as U.S. Pat. Nos. 4,539,256; 4,726,989) usually costs more than the dry-stretch process, and it creates environmental issues. It is not our interest. Our focus is on the clean dry-stretch process for the microporous membranes as separators for the lithium batteries.

Polyolefin, as used herein, refers to a class or group name for thermoplastic polymers derived from simple olefins. Exemplary polyolefins include polyethylene and polypropylene. Polyethylene refers to, for example, polymers and copolymer substantially consisting of ethylene monomers. Polypropylene refers to, for example, polymers and copolymers substantially consisting of propylene monomers.

Developed in the prior art are single-ply and multiply of dry-stretch microporous membrane from polyolefin resins, including polypropylene (PP) and polyethylene (PE), with at least three separate steps: (a) film extrusion (blown film or slit film), (b) annealing, and (c) stretching, as described in U.S. Pat. Nos. 3,426,754; 3,558,764; 3,679,538; 3,801,404; 3,801,692; 3,843,761; 4,138,459; 4,994,335 and 5,173,235.

The term, multiply, herein is defined as more than one ply of film or membrane stacked together and then rolled up into a big roll. The adhesion between plies is minimum, and the multiply films or membranes can be easily deplied into multiple single-ply film or membrane. So, multiply can be two-ply, four-ply, or eight-ply. In contrast, the term, multi-layer, herein is defined as more than one layer of film adhered together with a reasonably good adhesion. The multi-layer film (or membrane) can be handled as a single-ply film (or membrane). So, multi-layer can be bilayer, trilayer, penta-layer. For example, PP/PE/PP trilayer membrane means that the two layers of PP membrane sandwich one layer of PE membrane with a reasonably good adhesion, and that the trilayer can be handled as a single-ply membrane without losing its integrity.

The terms, microporous membrane and membrane, herein imply the open-cell microporous membrane.

In the prior art, U.S. Pat. No. 3,801,692, a cold stretching was applied right before hot stretching, and the stretched membrane gave a higher porosity.

In the prior art, U.S. Pat. No. 3,843,761, right after cold stretching, the precursor film was hot stretched in a plurality of discrete hot stretching increments. The obtained stretched microporous membrane had greater gas flux.

In the prior art, U.S. Pat. No. 4,058,582, more than two plies of precursor film were simultaneously stretched for the first time. The surface properties of microporous membranes were significantly improved.

In the prior art, U.S. Pat. No. 4,138,459, an additional heat relaxing step was added to the end of the hot stretching process, and the dimensional stability of the final membrane was improved with a significantly lower shrinkage.

In the recent multi-layer products (PP/PE/PP trilayer and PP/PE bilayer separators) as described in U.S. Pat. Nos. 5,565,281; 5,691,077; 5,952,120, the process also includes three separate steps: film extrusion, annealing and stretching. The extruded films are rolled up first into big film rolls, and the film rolls are then unrolled and fed to an oven for annealing. The annealed films are rolled up into multiply big rolls, and the annealed rolls are then unrolled and fed to another oven for stretching into membranes. The stretched membranes from the oven are rolled up into rolls with desired length and filter sent for deplying and slitting separately.

The disadvantages of the conventional process with separate steps are the following:

1. Yield loss due to many more start-ups and endings of the film rolls.
2. Potentially less stable product quality due to the start-up and ending of each step
3. More oven idle time during the change of film rolls
4. More space and film-roll/inventory management is needed for the intermediate products. It adds extra operation cost.
5. Need more manpower for more separate steps of operation. It adds extra operation cost.
6. Potentially more maintenance needed due to much more frequently machine on and off, especially with the ovens for annealing and stretching.

As described in U.S. Pat. Nos. 3,426,754; 3,558,764; 3,679,538; 3,801,404; 3,801,692; 3,843,761; 4,138,459; 4,994,335 and 5,173,235, the films (either blown film extrusion or slit film extrusion) was extruded with the state-of-the-art film extrusion machine technology for packaging films, which require as fast as possible. However, in the process for the dry stretch membranes, the fast film extrusion speed is not compatible with rest of the processes in ovens. It made the overall process break into three separate steps, which are undesirable. Even though the state-of-the-art film extrusion line can be run faster for multi-rolls for the followed separate processes in the oven, the obtained precursor film and membranes lost some products during start-up and ending in the separate oven processes. It lost the production efficiency.

Accordingly, there is a strong need to reinvent a process for low-cost membrane separators.

SUMMARY OF THE INVENTION

A continuous method for making microporous polyolefin (PP, PE or PP/PE/PP trilayer) membrane for use in battery separator having a thickness ranging from about 0.2 mil to about 4.0 mil comprising the sequential connected steps of: extruding multiple parison with multiple smaller film extrusion lines; collapsing the parison onto itself to form a flat sheet comprising multiple plies; annealing the multiply flat-sheet precursor films; stretching the multiply flat-sheet precursor films; and winding up the multiply flat-sheet membranes.

The novelty of this invention is to use multiple small film extrusion lines and to run at a line speed compatible with the speed of the following annealing step and then the following cold stretching step and then the following hot stretching step and then the following relaxing step. And, the sequential steps of making the dry-stretch membrane as described above are run continuously from film extrusion to film annealing and to film stretching without stop. In contrast, in the conventional process with separate steps, a single large film extrusion line is used to extrude the multiple rolls at a much faster speed. Then the multiple collected rolls of film are unrolled and fed to an annealing oven and collected as annealed rolls. The rolls of the collected annealed film are unrolled and fed to a stretching oven (cold and hot stretch) for the membrane rolls.

In this invention of the continuous process, the yield of the product is much higher; the operation cost is lower; the machine usage time is much higher; the more stable process is potentially for more stable quality product.

REFERENCE NUMERALS IN DRAWINGS

Figure 1:
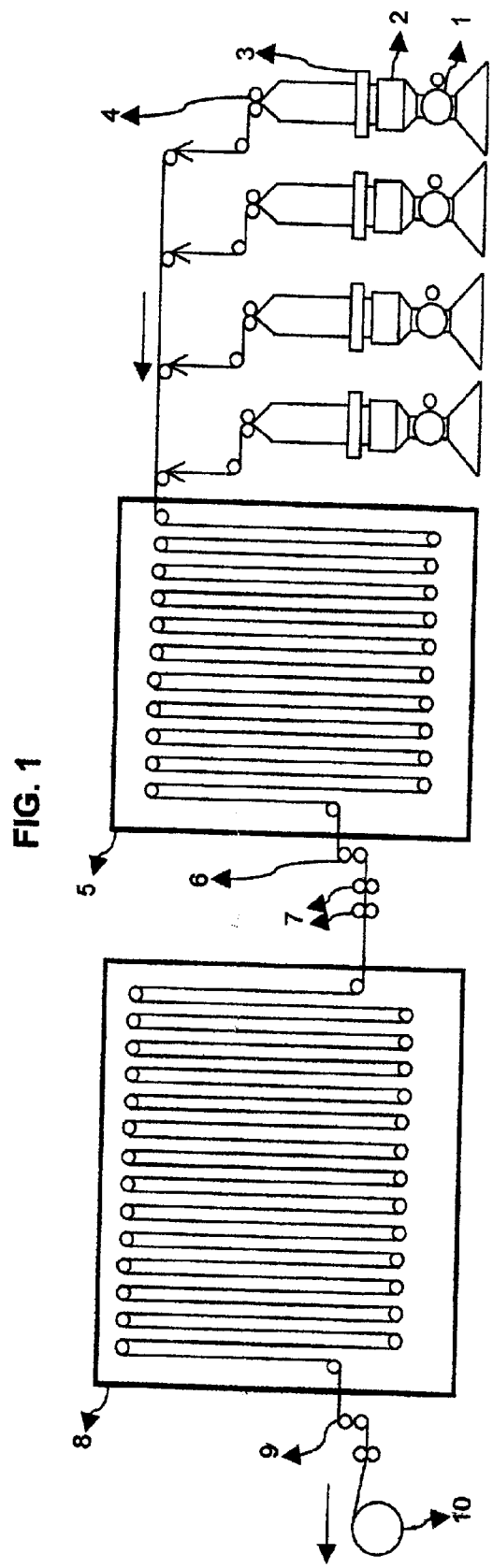
FIG. 1 schematically illustrates the continuous process of making multiply PP membranes or multiply PE membranes, in which each ply has a thickness ranging from 0.2 mil to 2 mil.

1. Extruder
2. Die
3. Air Ring
4. Collapsing frames and collapsing rolls
5. Annealing Oven
6. Quenching Rolls
7. Cold-stretching rolls
8. Stretching Oven
9. Quenching Rolls
10. Winder Roll
11. Two-ply collapsed PP precursor films with two edges trimmed
12. one of the two-ply PP film 11.
13. one of the two-ply PP film 11.
14. Two-ply collapsed PE precursor films with two edges trimmed
15. non-bonded PE/PP bilayer
16. one-ply PE from 14.
17. two-ply PP film
18. non-bonded PP/PE bilayer
19. two-ply non-bonded PP/PE/PP trilayer films
20. four-ply non-bonded PP/PE/PP trilayer films

DESCRIPTION OF THE INVENTION

The present invention shall be described in further detail below by way of the following detailed description and the non-limiting examples.

The battery separators according to the instant invention of continuous process comprises singly-ply polyolefin (preferably PP or PE) microporous membranes, the thickness of which ranges from 0.2 mil to 2.0 mil. One mil is equal to 0.001 inch. The instant invention uses one or multiple small film-extrusion lines, preferably four blown-film extrusion lines, placed directly before annealing oven at a line speed compatible with the line speed of the annealing process in the annealing oven. So, the extruded multiple-ply films from multiple film-extrusion lines can be continuously and directly fed to the annealing oven. Following that, the exit of the annealing oven is aligned with the entrance of stretching oven, which is composed of cold stretching section, then hot stretching section, and then relaxing/heat-set section. At the end of the stretching oven, a winder collects the stretched membrane cut at the desired length for further separate deplying and slitting process. The process of the instant invention produces the dry-stretch microporous membrane separator continuously and directly from extrusion to annealing and to stretching. The process of the instant invention provides the advantages of (1) higher yield, (2) more stable quality products, (3) more machine time usage, (4) no need to handle and manage the intermediate product rolls, (5) less manpower needed and (6) less maintenance with this continuous process.

In summary, the inventive continuous process provides a big jump in production efficiency by converting a single large fast film extrusion line into multiple smaller film extrusion lines. The latter runs continuously at a compatible speed with the followed annealing and stretching operations.

FIG. 1 shows an example of the set-up for the continuous production line for multiply PP or PE membranes, in which each ply has a thickness ranging from 0.2 mil to 2 mil. Extruder 1 is hooked up with a rotational circular die 2. The die 2 extrudes a tubular film going through an air ring 3 to form a bubble. The bubble is collapsed by a pair of collapsing frames 4 and by a pair of collapsing rolls 4 to form two-ply films. Four two-ply films are continuously fed to an annealing oven 5. At the exit of the annealing oven 5, the total eight-ply annealed films are quenched with a pair of quenching rolls 6. The eight-ply quenched, annealed films are continuously fed through two pair of cold-stretching rolls 7, and then through an oven 8 for stretching. At the exit of the stretching oven 8, the eight-ply stretched membranes are quenched with a pair of quenching rolls 9 before the eight-ply membranes are collected on a winder roll 10.

Figure 2:
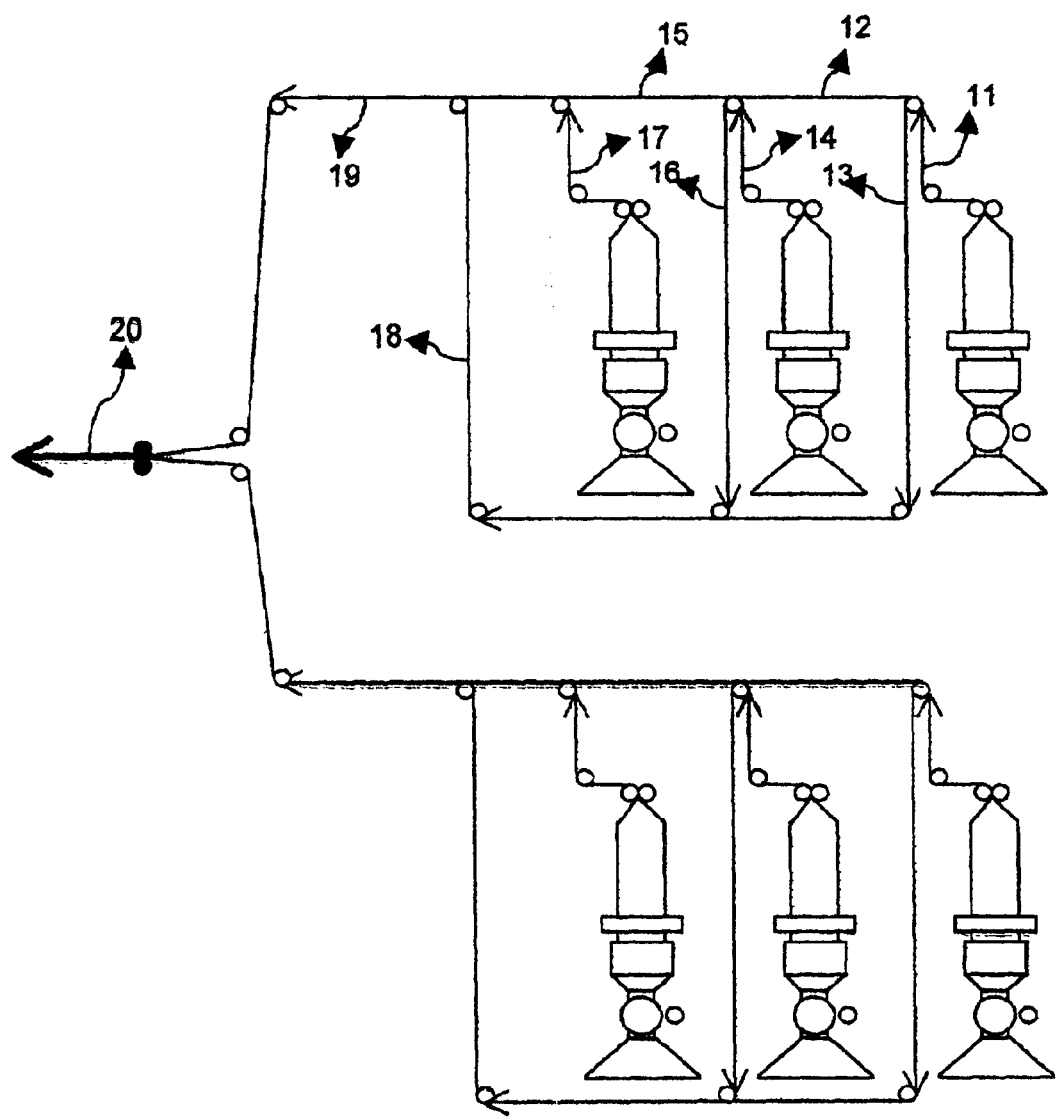
FIG. 2 schematically illustrates the film-extrusion set-up for making multiply PP/PE/PP trilayer precursor films. The combined multiply PP/PE/PP precursor films are continuously fed to annealing oven for annealing and bonding between PP and PE layers.

FIG. 2 shows an example of the film-extrusion set-up for making multiply PP/PE/PP trilayer precursor films, in which each ply has a thickness ranging from 0.6 mil to 4 mil.

Two-ply collapsed PP precursor films 11 with two edges trimmed are separated into two separate plies of films, 12 and 13. Two-ply collapsed PE precursor films 14 with two edges trimmed are separated into two separate plies of films, part of 15 and 16. One ply of PP film 12 and one ply of PE film from trimmed PE film 14 form PP/PE non-bonded bilayer 15. Below the extrusion lines, a non-bonded PP/PE bilayer 18 is continuously fed to combine with two-ply PP film 17 and with PE/PP non-bonded bilayer 15 to form two-ply non-bonded PP/PE/PP trilayer films 19. The two-ply non-bonded PP/PE/PP trilayer films 19 are combined with another stream of two-ply non-bonded PP/PE/PP trilayer films to form four-ply non-bonded PP/PE/PP trilayer films 20. The combined four-ply PP/PE/PP precursor films are continuously fed to annealing oven for annealing and bonding between PP and PE layers. Then, the annealed films are continuously fed through the cold stretching unit and through the hot-stretching oven to form PP/PE/PP trilayer membrane as described in FIG. 1. In this invention, the process is continuous while in the prior art U.S. Pat. No. 5,952,120, the process is comprised of separate steps.

The detailed running conditions in the annealing and stretching ovens are mostly described in the prior art for dry-stretch polyolefin microporous membranes. For example, annealing temperature, stretching temperature, line speeds in the oven, cold stretching ratio, hot stretching ratio and heat-set/relaxing ratio can be the same as or different from those described in the prior art, U.S. Pat. No. 4,138,459 for multiply (PP or PE) single-layer separator, U.S. Pat. No. 5,952,120 for multiply PP/PE/PP trilayer separator, U.S. Pat. No. 6,057,060 for multiply ultra-thin (PP or PE) separator. They need to be adjusted based on different grades of PP or PE raw materials used.

The following lists an example of production efficiency advantage with the continuous method described herein. Taking the example shown in FIG. 1, Table 1 list the comparison of production efficiency between the continuous process and the process comprised of separate steps.

change, roll starting up and roll ending. The operation cost is estimated to be 80% of that in the separate processes because of no need for operation, management and storage for intermediate products. So, the total productivity index is estimated to be 115.0%.

The production efficiency of the continuous process in this invention is much greater than that of the conventional separate processes.

The extrusion conditions are mainly dominated by the process conditions in the ovens, especially to the film-extrusion line speed. It needs to be compatible with the planned line speed in the annealing oven so that it can be run continuously. For the PP/PE/PP trilayer membrane, the PP film extrusion and the PE film extrusion need to be run at the same speed. The preferred annealing line speed ranges from 15 ft/min and 35 ft/min. The film extrusion speed is preferably in the range of 15 ft/min and 35 ft/min. In the conventional processes of separate steps, the higher line extrusion speed is preferred. In the prior art, with the conventional separate processes, the film extrusion line speed is preferably in the range of 30 ft/min and 700 ft/min for blown film extrusion and preferably in the range of 50 ft/min and 500 ft/min for slit film extrusion as described in the prior art, U.S. Pat. Nos. 3,426,754; 3,558,764; 3,679,538; 3,679,540; 3,801,404; 3,801,692; 3,843,761; 3,932,682. For the line speed of blown film extrusion for the precursor in another prior art U.S. Pat. Nos. 4,994,335; 5,173,235, the line speed of extrusion was in the range of 100 ft/min and 120 ft/min (30 meter/min and 36 meter/min). In this invention, the line extrusion speed is preferred at a compatible speed with the line speed in the annealing oven. Film extrusion line speeds can be higher than 35 ft/min, but it needs longer ovens to accommodate the need of the optimized residence time of the film in the ovens. In this case, the investment of oven capital is required more, but it certainly produces even more products.

The overall process speeds of this invention need to be considered from technical point of view and from business point of view.

TABLE 1

Comparison of production efficiency between the separate process and the continuous process

| | Product Yield PY | Runnable Machine Usage, RMU | Operation Cost OC | Productivity Index PY * RMU/OC |
|---|---|---|---|---|
| Separate Processes | 68% | 80% | 100% | 54.4% |
| Continuous Process Of this Invention | 92% | 100% | 80% | 115.0% |

The separate processes are comprised of three separate steps: film extrusion, annealing and stretching. The estimate yields are 90% for film extrusion, 90% for annealing and 85% for stretching. The yield of stretching is expected to be lower because of losing the film during starting-up and ending under high tension. Runnable machine usage is estimated to be 80% because of idle time during roll change, starting up, and ending. The operation cost is assumed to be 100% as a comparison basis. So, the total productivity index is estimated to be 54.4%.

In contrast, the continuous process of this invention is a single step. The yield of film extrusion is estimated to be 95%, slightly higher than that in the separate processes because of no roll-collection operation. Membrane collection yield at the end of the process is expected to be 98%. So, the product yield would be 92%. Runnable machine usage is expected to be 100% because of no idle time for roll The following examples demonstrate the quality precursor produced at a preferable speed described above, and the precursor can be made into the quality membrane.

EXAMPLE 1

PP(Fina PP 3271) produced by Fina Oil & Chemical has a density of 0.905 g/cc and a melt index of 1.5 g/10 min. PE(Hizex 5202B) produced by Mitsui Chemical has a density of 0.964 g/min and a melt index of 0.3 g/10 min. Either PP or PE are blended with 2500 ppm sodium benzoate as a nucleating agent to promote the crystal formation during film formation at a lower speed. A blown-film extrusion line made by Lung-Meng Plastics Machinery is equipped with a ~1.6 inch diameter of screw with a L/D ratio of 36. The line is equipped with a 300-cm circular die with a die gap of ~100 mil. The air ring height is adjusted to a level around 1.0 inch above the die.

The PP and PE precursor films have been annealed in a batch convention oven, respectively, at 150° C. and 120° C. for ~12 min. The annealed precursors are further stretched on an Instron Machine equipped with an environment control chamber. PP films are stretched, respectively, at 150° C., 20% cold stretch, 140% hot stretch, 40% relax; PE films, at 120° C., 40% cold stretch, 140% hot stretch, and 40% relax.

TABLE 2

| Resin | Extrusion Line Speed | Membrane Thickness | Gurley |
|---|---|---|---|
| Fina PP 3271 | 30 ft/min | 1.03 mil | 26 sec |
|  | 25 ft/min | 1.04 mil | 32 sec |
|  | 20 ft/min | 1.02 mil | 40 sec |
| Hizex 5202B | 35 ft/min | 1.02 mil | 28 sec |
|  | 30 ft/min | 1.01 mil | 33 sec |
|  | 25 ft/min | 1.00 mil | 40 sec |

From the above example, the film precursors from lower extrusion speed can yield quality membranes. There are no prior art found that this preferred slower line speed of film extrusion in this invention can result in quality membranes. In the same way, ultra-thin PP and ultra-thin PE precursor films (0.2~0.5 mil) can be extruded at the preferred line speed for making PP/PE/PP trilayer separator, continuously. The intention of the lower extrusion speed is to lower down the line speed in the ovens, which will need smaller size of ovens for the same residence time.

The detailed running conditions in the annealing and stretching ovens are mostly described in the prior art for dry-stretch polyolefin microporous membranes. For example, annealing temperature, stretching temperature, line speeds in the oven, cold stretching ratio, hot stretching ratio and heat-set/relaxing ratio can be the same as or different from those described in the prior art, U.S. Pat. No. 4,138,459 for multiply (PP or PE) single-layer separator; U.S. Pat. No. 5,952,120 for multiply PP/PE/PP trilayer separator, U.S. Pat. No. 6,057,060 for multiply ultra-thin (PP or PE) separator. They need to be slightly adjusted based on different grades of PP or PE raw materials used.

According to the above information, one can estimate the needed length of film path in the annealing oven to be equal to Extrusion Line Speed multiplying 12 min. According to the stretch ratios, one can estimate the needed length of film path in the stretching oven. The slower line speed of extrusion requires shorter length of film path in the ovens. One of the major advantages with it is that the shorter length of film path in the annealing oven and then in the stretching oven allows the smaller needed size of the ovens and then the less investment. Another advantage with the preferred line speed of the film extrusion is to allow an excellent control on the overall operation of the continuous process in this invention.

The continuous method of this invention will benefit the process at both fast and slow film extrusion speeds.
Test Methods:
  Gurley ASTM-D726(B)
  Gurley is a resistance to air flow measured by the Gurley densometer. Gurley is the time in seconds required to pass 10 cc of air through one square inch of product under a pressure of 12.2 inches of water pressure.
  Porosity ASTM D-2873
  Density ASTM D-792
  Melt Index ASTM D 1238; PE: 190° C./2.16 Kg; PP: 230° C./2.16 Kg.

CONCLUSION, RAMIFICATIONS, AND SCOPE OF INVENTION

Thus the reader will see that the continuous process of this invention can produce dry-stretch PP, PE, and PP/PE/PP trilayer membrane separators in a highly efficiency. The preferred extrusion line speed with multiple blown film extrusion (or slit film extrusion) can be a line speed compatible with the line speed in the annealing oven. The membrane thickness can be in the range of 0.2 mil and 4.0 mil. The annealing conditions and stretching conditions can be the conditions described herein or the conditions in the prior art.

The raw material used is polyolefin as defined early. In PP/PE/PP trilayer membrane separators, the PE layer is served as potential shutdown layer as described in U.S. Pat. No. 5,691,077. In this invention, the PE layer can be a pure PE resin, PE containing particles, as described in U.S. Pat. No. 6,080,507, and PE containing other additives or minor polymeric components (less than 30%). All the membranes obtained from the invented continuous process will not be involved in solvent.

The present invention may be embodied in other specific forms without departing from the spirit or essential attributes thereof, and, accordingly, reference should be made to the appended claims, rather than to the foregoing specification as indicating the scope of the invention.

What is claimed:

1. A continuous method of making a microporous polyolefin (polypropylene or polyethylene) membrane for use as a battery separator having a thickness ranging from about 0.20 mils to about 2.0 mils comprising sequential connected continuous steps of:

extruding parison (precursor film) with from one film-extrusion line to five film extrusion lines with either blown-film circular dies or slit-film slit dies;

collapsing the parison onto themselves to form multiply flat sheets comprising from two plies to ten plies;

annealing the multiply flat sheets;

stretching the annealed multiply flat sheet for the microporous membrane; and winding up the multiply microporous membrane for further separate deplying and slitting operation.

2. A continuous method of making a microporous polyolefin (polypropylene or polyethylene) membrane for use as a battery separator having a thickness ranging from about 0.20 mils to about 2.0 mils comprising sequential connected continuous steps of:

extruding parison with from one film extrusion line to five film extrusion lines with either a blown-film circular die or slit-film slit dies at a preferred film-line speed in the range of 15 ft/min and 35 ft/min;

collapsing the parison onto themselves to form multiply flat sheets comprising from two plies to ten plies;

annealing the multiply flat sheets;

stretching the annealed multiply flat sheet for the microporous membrane; and winding up the multiply microporous membrane for further separate deplying and slitting operation.

* * * * *